Jan. 31, 1933. P. W. STEPHENS 1,895,496
STEEL WOOL HOLDER
Filed March 6, 1930
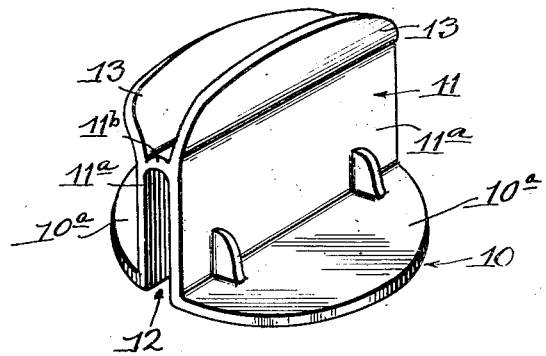
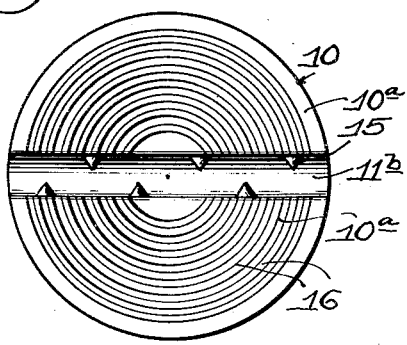
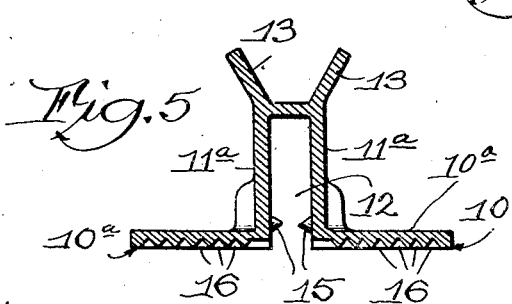
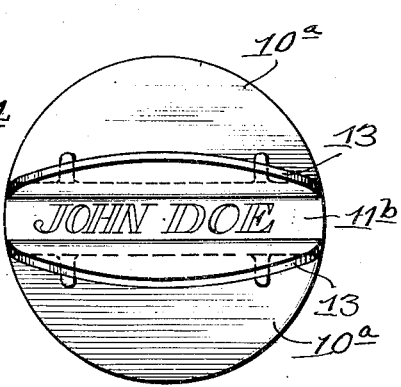
Inventor,
Percy W. Stephens, Patented Jan. 31, 1933

1,895,496

UNITED STATES PATENT OFFICE

PERCY W. STEPHENS, OF CHICAGO, ILLINOIS

STEEL WOOL HOLDER

Application filed March 6, 1930. Serial No. 433,607.

This invention relates to improvements in holding devices for steel wool and similar rubbing materials, and has for its principal object to provide an improved device of the character described.

The present application is a continuation in part of my prior application bearing Serial No. 383,662, filed August 5, 1929, now abandoned.

The invention may best be understood by reference to the accompanying drawing, in which Figure 1 is a perspective view of one form of holder constructed in accordance with my invention.

Figure 2 is a bottom view of the holder shown in Figure 1.

Figure 3 is a transverse vertical section of the holder shown in Figure 1.

Figure 4 is a top view of the holder shown in Figure 1.

Figure 5 is a transverse vertical section of a modified form of holder.

Referring to the details of the drawing, the form of holder shown in Figures 1 to 4, inclusive, comprise a relatively flat bearing surface 10, herein circular in shape, and consisting of two separated co-planar semi-circular plates 10a, 10a, connected together by an upstanding handle portion 11 forming the gripping portion of the device. Said handle is formed of two spaced upright walls 11a, 11a connected near their upper ends by a cross part 11b, to form a groove 12. Said cross part is preferably of greater flexibility than the adjacent parts of the device. In the form shown in Figures 1 and 3, said cross part 11b is arched in cross section so as to form, with the upright wall, a handle portion substantially of inverted U-shape.

The entire device is preferably formed of a semi-flexible material such as rubber, molded in a single piece.

A plurality of engaging fingers 15, 15 are disposed in suitable spaced relation along opposite lower margins of the upright walls 11a, 11a in order to assist in holding the rubbing material. In the form shown, these fingers are formed integrally with the piece.

A plurality of grooves 16, 16 herein formed concentrically with the two semi-circular plates 10a, 10a which are especially designed to resist outward movement or "creeping" of the rubbing material from the central groove 12 toward the outer margins of the device, when in use.

The parts of the device above described are arranged and constructed substantially the same as disclosed in my prior application hereinabove described.

Referring now more particularly to the subject matter of the present invention, it will be observed that I provide a pair of extensions 13, 13, each forming a continuation of one of the upright walls 11a and extending upwardly beyond the cross part 11b. These extensions are preferably inclined outwardly from each other, as is best shown in Figure 3. The purpose of these extensions will now be described.

When the device is to be used, the upright portions 11a, 11a are flexed or spread outwardly to grip the upper part of the steel wool or other scrubbing material in the groove 12. The extensions 13, 13 provide a simple and effective means of flexing the upright walls. Simply by grasping the upper ends of said extensions between the fingers and pressing them together, they act as levers fulcruming on the cross part 11b, and thus cause their respective upright portions 11a, 11a to be spread away from each other to any position required for gripping purposes. Then by slipping the fingers downwardly below the cross part 11b, the device is closed upon the steel wool to hold it securely in place.

It will now be observed that the hand of the user is fully protected from contact with the material and pressure may be applied to the latter over the entire bearing surface of the device by gripping it in such a manner as to support the upper surface of the semi-circular parts 10a, 10a.

In the modified form of device shown in section in Figure 5, the cross part 11b forming the flexing connection between the upright portions 11a, 11a of the handle is disposed substantially horizontally, instead of being arched in cross section. This arrangement has the added advantage that the upper surface of said cross part is relatively flat and thus more satisfactory for advertising matter or the like, as seen in Figure 4.

Although I have illustrated and described certain embodiments of my invention, it will be understood that I do not wish to be limited to the specific constructions shown and described, but that various changes and modifications may be made without departing from the spirit and scope of my invention.

I claim:

A holder of the class described, comprising a U-shaped body formed of resilient material and including two normally vertically-extending walls arranged in substantial parallelism, in combination with a laterally extending supporting flange projecting outwardly from the lower edge of each wall, and an inclined flange integrally connected to the upper edge of each wall and extending outwardly at an angle therefrom.

Signed at Chicago, Illinois, this 4th day of March, 1930.

PERCY W. STEPHENS.